(12) United States Patent
Mori et al.

(10) Patent No.: US 6,857,594 B2
(45) Date of Patent: Feb. 22, 2005

(54) WEBBING WINDING DEVICE (75) Inventors: Shinji Mori, Aichi-ken (JP); Fuminori Komiya, Aichi-ken (JP); Teruhiko Koide, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 47 days.

(21) Appl. No.: 10/615,390

(22) Filed: Jul. 9, 2003

(65) Prior Publication Data
US 2004/0079828 A1 Apr. 29, 2004

(30) Foreign Application Priority Data
Jul. 11, 2002 (JP) ........................................ 2002-202816

(51) Int. Cl.[7] .............................................. B65H 75/48
(52) U.S. Cl. ...................................................... 242/374
(58) Field of Search .............................. 242/374, 390.8, 242/390.9; 280/806, 807; 297/478

(56) References Cited

U.S. PATENT DOCUMENTS

| 4,423,846 | A | * | 1/1984 | Fohl | 242/374 |
| 4,750,685 | A | * | 6/1988 | Frei | 242/374 |
| 5,098,030 | A | * | 3/1992 | Kosugi | 242/374 |
| 5,529,258 | A | * | 6/1996 | Dybro et al. | 242/374 |
| 5,918,717 | A | * | 7/1999 | Fohl | 242/374 |
| 6,626,388 | B2 | * | 9/2003 | Nagata et al. | 242/374 |
| 2003/0052209 | A1 | * | 3/2003 | Honl et al. | 242/374 |

FOREIGN PATENT DOCUMENTS

| DE | 201 15 316 | * | 3/2002 |
| EP | 1 195 536 | * | 4/2002 |
| JP | 3-65455 | * | 3/1991 |

* cited by examiner

Primary Examiner—William A. Rivera
(74) Attorney, Agent, or Firm—Nixon Peabody LLP (57) ABSTRACT In a webbing winding device, when an external gear of a clutch receives driving force of a motor and rotates in a winding direction, a pressing portion of an inertial plate pushes a pawl and meshes the pawl with outward teeth of an adaptor. Consequently, the winding shaft rotates in the winding direction. When the external gear receives rotating force of the motor and rotates in a drawing out direction, another pushing portion of the inertial plate pushes another pawl and meshes the pawl with the outward teeth of the adapter. Consequently, the winding shaft rotates in the drawing out direction. Thus, by providing these pawls, in this webbing winding device it is possible to transmit both forward-rotation and reverse-rotation of the motor for rotating the winding shaft.

10 Claims, 5 Drawing Sheets

WEBBING WINDING DEVICE

CROSS-REFERENCE TO RELATED APPLICATION

This application claims priority under 35 USC 119 from Japanese Patent Application No. 2002-202816, the disclosure of which is incorporated by reference herein.

BACKGROUND OF THE INVENTION

1. Field of the Invention

The present invention relates to a webbing winding device which structures a seat belt apparatus for restraining, with a long belt-form webbing belt, a body of an occupant sitting on a seat of a vehicle or the like.

2. Description of the Related Art

A seat belt apparatus, which restrains a body of an occupant sitting at a seat of a vehicle with a webbing belt, is equipped with a webbing winding device fixed to a body of the vehicle sideward of the seat. The webbing winding device is equipped with, for example, a spool (winding shaft) whose axial direction is substantially along a front-rear direction of the vehicle. A length direction base end side of the webbing belt is anchored at the spool. The spool can wind the webbing belt on in a layered form at an outer peripheral portion of the spool. Thus, when the seat belt apparatus is not in use, the webbing belt can be wound on and accommodated at the outer peripheral portion of the spool.

An urging member such as a spiral spring or the like is provided at the webbing winding device, and urges the spool in a winding direction for winding up the webbing belt. The webbing belt is wound on and accommodated by urging force of this urging member, and slackness and the like of the webbing belt is eliminated by the urging force of the urging member in a state in which the webbing belt is applied to the body of the occupant.

Further, a mechanism has been considered in which, at a time of rapid deceleration of the vehicle or the like, a slight looseness known as "slack" or the like is eliminated and a restraining force from the webbing belt on the body of the occupant is increased, by winding the webbing belt onto the winding shaft by a certain amount. Thus, the body of the occupant is more assuredly held. This type of mechanism often has a structure which detects the state of rapid deceleration of the vehicle with an acceleration sensor, and forcibly rotates the winding shaft in the winding direction on the basis of an electronic signal from the acceleration sensor.

Meanwhile, a structure has also been considered which detects a distance forward to another vehicle, an obstacle or the like with a distance sensor or the like and, when the distance forward to the vehicle, obstacle or the like falls below a certain value, drives a motor and rotates the winding shaft in the winding direction by rotating force of the motor.

Accordingly, in the case of a structure which rotates the winding shaft in the winding direction by rotating force of the motor, a "one-way clutch" is interposed between an output shaft of the motor and the winding shaft. This one-way clutch is generally structured to couple the output shaft with the winding shaft only when the output shaft of the motor rotates in a direction for winding the webbing belt onto the winding shaft. Thus, at a time of usual winding of the webbing belt onto the winding shaft, a time of drawing out the webbing belt from the winding shaft and the like, rotation of the winding shaft is not transmitted to the output shaft of the motor.

Incidentally, improving restraining force from the webbing belt and more assuredly holding the body of the occupant is preferable when a distance forward to a vehicle, obstacle or the like is less than a certain value. More specifically however, in a case in which a distance forward to a vehicle, obstacle or the like is sufficiently large, if the webbing belt restrains the body of the occupant with a large force, the occupant feels an excessive sensation of pressure, which is not preferable.

Accordingly, a structure has been considered which, when a distance forward to a vehicle, obstacle or the like becomes sufficiently large after having been in the above-described state in which the distance forward to the vehicle, obstacle or the like is less than the certain value, rotates the winding shaft by a certain amount in the drawing out direction by driving force of a motor, slightly loosens the webbing belt in its applied state, and alleviates the sensation of pressure.

Now, both in this structure which slightly loosens the webbing belt in the applied state and alleviates the sensation of pressure and in the structure which rotates the winding shaft by a certain amount in the winding direction to raise the restraining force from the webbing belt in a state of rapid deceleration, driving force of a motor is used. Thus, it is easy to devise a structure that is capable of realizing these two functions by forward-rotation and reverse-rotation of a motor.

However, as described above, the one-way clutch, which couples the output shaft of the motor and the winding shaft in the state of rapid deceleration of the vehicle, is a structure which does not couple the output shaft of the motor with the winding shaft when the winding shaft rotates or the output shaft rotates in the direction opposite to the direction for winding the webbing belt on the winding shaft. Therefore, it is necessary to add an extra clutch mechanism, to couple the output shaft of the motor with the winding shaft when the output shaft rotates in the direction opposite to the direction for winding up the webbing belt. Hence, the clutch mechanism becomes large and complicated.

SUMMARY OF THE INVENTION

In consideration of the circumstances described above, an object of the present invention is to provide a webbing winding device which is capable of transmitting driving force of both forward-rotation and reverse-rotation of driving section, such as a motor or the like, to a winding shaft with a simple clutch mechanism.

A first aspect of the present invention is a webbing winding device comprising a winding shaft, at which a base end of a long belt-form webbing belt for restraining a body of a vehicle occupant by being applied at the body is anchored, and which rotates in a winding direction around a shaft center thereof for winding the webbing belt at an outer peripheral portion thereof in a layer form, and rotates in a drawing out direction, which is opposite to the winding direction, when the webbing belt is drawn out; an input gear which is mechanically coupled to the winding shaft, the input gear rotating for rotating the winding shaft, and a plurality of teeth being formed with constant intervals on the input gear in a circumference of the input gear; a motor side rotating body directly or indirectly coupled to a driving section, the motor side rotating body rotating by receiving driving force of the driving section; at least one first coupling member which rotates about an axis of the input gear in conjunction with rotation of the motor side rotating body, and is moveable toward and away from the teeth of the input gear in conjunction with rotation of the motor side rotating body one way about an axis thereof, the first coupling member meshing with the input gear by moving toward the teeth, transmitting the rotation the one way about the axis of the motor side rotating body to the input gear, and rotating the input gear in the winding direction; and at least one second coupling member which rotates about the axis of the input gear in conjunction with the rotation of the motor side rotating body, and is moveable toward and away from the teeth of the input gear in conjunction with rotation of the motor side rotating body the other way about the axis thereof, the second coupling member meshing with the input gear by moving toward the teeth, transmitting the rotation the other way about the axis of the motor side rotating body to the input gear, and rotating the input gear in the drawing out direction.

According to the webbing winding device with the structure described above, the base end side of the webbing belt is anchored at the winding shaft. When, for example, the webbing belt is not in use, the webbing belt is wound up, from the base end side thereof, in a substantially laminar form at the periphery of the winding shaft, and is accommodated.

In this state, when the webbing belt is pulled, the winding shaft rotates in a drawing out direction and the webbing belt which has been wound on the winding shaft is drawn out.

Further, when the winding shaft is rotated in the winding direction with the webbing belt being in this drawn-out state, the webbing belt is wound on at the winding shaft from the base end side, and the webbing belt is accommodated again.

In this webbing winding device the motor side rotating body is mechanically connected to the driving section. When the driving section operates, the motor side rotating body is rotated by the driving force of the driving section. Hence, a plurality of connecting members rotate about the axis of the input gear in conjunction with the rotation of the motor side rotating body.

The input gear is mechanically connected with the winding shaft. When the input gear rotates, the rotation of the input gear is transmitted to the winding shaft, and the winding shaft rotates in the winding direction or the drawing out direction. Here, if neither of the first and second coupling members is meshed with the teeth of the input gear, the input gear will not rotate. Consequently, the driving force of the driving section will not be transmitted to the winding shaft.

In contrast, when the first coupling member moves closer to the input gear and meshes with the teeth of the input gear in the state in which the motor side rotating body is rotating the one way about the axis thereof, this first coupling member, which rotates together with the motor side rotating body, pushes against the teeth of the input gear and rotates the input gear about the axis thereof. Consequently, the rotation of the input gear is transmitted to the winding shaft, and the winding shaft is rotated in the winding direction.

Accordingly, with a structure which operates the driving section according to an acceleration sensor, which detects a state of rapid deceleration of the vehicle, or the like, the webbing belt is wound up by a certain amount in the state of rapid deceleration of the vehicle. Thus, the body of the occupant, which works to move toward the frontward side of the vehicle due to inertia of the body when the vehicle rapidly decelerates, can be assuredly held and restrained.

On the other hand, when the second coupling member moves closer to the input gear and meshes with the teeth of the input gear in the state in which the motor side rotating body is rotating the other way about the axis thereof, this second coupling member, which rotates together with the motor side rotating body, pushes against the teeth of the input gear and rotates the input gear about the axis thereof. Consequently, the rotation of the input gear is transmitted to the winding shaft, and the winding shaft is rotated in the drawing out direction.

Accordingly, at a usual time or when a state of rapid deceleration of the vehicle or the like is released after the webbing belt has been wound up by the certain amount, the driving section is operated, the motor side rotating body is rotated the other way about the axis, and the winding shaft is rotated by the certain amount in the drawing out direction. Thus, restraining force from the webbing belt can be reduced at times of usual running (that is, in states which are not the aforementioned state of rapid deceleration of the vehicle). Consequently, a sensation of pressure, sensation of discomfort and the like due to the application of the webbing belt to the occupant can be moderated.

Further, the webbing belt can be easily drawn out when, for example, the occupant applies the webbing belt, by operating the driving section, rotating the motor side rotating body the other way about the axis, and rotating the winding shaft in the drawing out direction. In particular, in a case in which an urging member such as a spiral spring or the like, which increases an urging force urging the winding shaft in the winding direction in accordance with increases in a degree of rotation of the winding shaft in the drawing out direction, or the like is provided, the driving force of the driving section acts to oppose the urging force of the urging member. Consequently, the webbing belt can be drawn out by the occupant or the like with a comparatively light force.

In a webbing winding device of a second aspect of the invention, according to the first aspect of the present invention, the webbing winding device further comprises an inertial mass body provided to be coaxial and relatively rotatable with respect to the motor side rotating body, the first coupling member and the second coupling member being supported at the inertial mass body to be moveable toward and away from the input gear; coupling compelling portions integrally provided at the inertial mass body, the coupling compelling portion moving the first coupling member toward the teeth of the input gear in conjunction with relative rotation, with respect to the motor side rotating body, of the inertial mass body the other way about the axis of the motor side rotating body, and moving the second coupling member toward the teeth of the input gear in conjunction with relative rotation, with respect to the motor side rotating body, of the inertial mass body the one way about the axis of the motor side rotating body; and at least one urging section for, in accordance with the rotation of the motor side rotating body, urging the inertial mass body in the direction of the rotation of the motor side rotating body and causing the inertial mass body to rotate to follow the motor side rotating body.

According to a webbing winding device with the structure described above, when the driving section operates and the motor side rotating body rotates, the urging section acts to rotate the inertial mass body in the direction of rotation of the motor side rotating body, while the inertial mass body acts, by inertia due to mass thereof, to stay still. Thus, the inertial mass body rotates relatively with respect to the motor side rotating body, which is rotating because of the driving force of the driving section.

Here, the coupling compelling section is provided integrally at the inertial mass body. When the motor side rotating body rotates the one way about the axis, the inertial mass body rotates relatively the other way about the axis. At this time, the coupling compelling section compellingly moves the first coupling member toward the teeth of the input gear, and the first coupling member is compellingly meshed with the teeth of the input gear. Consequently, the rotation of the motor side rotating body the one way about the axis is transmitted to the input gear via the first coupling member, and the winding shaft is rotated in the winding direction.

In contrast, when the motor side rotating body rotates the other way about the axis, the initial mass body rotates relatively the one way about the axis. At this time, the coupling compelling section compellingly moves the second coupling member toward the teeth of the input gear, and the second coupling member is compellingly meshed with the teeth of the input gear. Consequently, the rotation of the motor side rotating body the other way about the axis is transmitted to the input gear via the second coupling member, and the winding shaft is rotated in the drawing out direction.

Thus, with this webbing winding device, the first coupling member or the second coupling member can be meshed with the input gear in accordance with the rotation direction of the motor side rotating body, simply by relative rotation of the inertial mass body relative to the motor side rotating body. Therefore, structure can be made simple, and costs can be reduced.

In a webbing winding device of a third aspect and a fourth aspect of the present invention according to the first and the second aspects respectively, the motor side rotating body is a substantially ring-like external gear, the external gear being axially supported at the winding shaft to be coaxially relatively rotatable with respect to the winding shaft, a plurality of outward teeth being formed at an outer peripheral portion of the external gear, and the external gear being directly or indirectly connected to a drive gear which is rotated by the driving force of the driving section, the input gear is disposed at an inner side of the external gear and coaxially and integrally coupled with the winding shaft, the teeth of the input gear being formed at an outer peripheral portion of the input gear, and the external gear supports the first and the second coupling members, to be moveable toward and away from the input gear, between the external gear and the input gear in a radial direction of the external gear.

According to a webbing winding device with the structure described above, the external gear which structures the motor side rotating body is directly or indirectly connected with the driving gear, which is rotated by the driving force of the driving section. Because the external gear is axially supported to be coaxial at the winding shaft, when the driving gear is rotated by the driving force of the driving section, the rotation of the driving gear is transmitted to the external gear, and the external gear rotates about the axial center of the winding shaft.

At the inner side of the external gear which is formed in a ring shape, the input gear is coupled coaxially and integrally with the winding shaft. Furthermore, the first and the second coupling members are supported at the external gear, between the external gear and the teeth formed at the outer peripheral portion of the input gear, to be moveable toward and away from the input gear.

Accordingly, when the first or the second coupling member is not meshed with the input gear in a state of rotation of the external gear, the external gear rotates relatively with respect to the winding shaft, and when the coupling member is meshed with the input gear in a state of rotation of the external gear, the external gear and the winding shaft rotate integrally.

With this webbing winding device, because the input gear and the coupling members are disposed at the inner side of the external gear as described above, in basic terms, respective members of the external gear, the input gear and the coupling members are completely accommodated essentially within the size of the external gear. Thus, clutching section for coupling and breaking the winding shaft and the driving section can be made compact.

In a webbing winding device of a fifth aspect of the present invention according to the second aspect, the first coupling member is provided with a first coupling plate for meshing with the tooth of the input gear and a first release plate for releasing meshing of the tooth of the input gear and the first coupling plate, and the second coupling member is provided with a second coupling plate for meshing with the tooth of the input gear and a second release plate for releasing meshing of the tooth of the input gear and the second coupling plate.

In a webbing winding device of a sixth aspect of the present invention according to the fifth aspect, protruding direction of the first coupling plate is substantially opposite to that of the second coupling plate in a circumference direction of the motor side rotating body, and protruding direction of the first releasing plate is substantially opposite to that of the second releasing plate in the circumference direction.

In a webbing winding device of a seventh aspect of the present invention according to the fifth aspect, the first coupling plate is provided with a first inclined surface inclining with respect to the circumference direction toward a radial direction of the motor side rotating body, and the second coupling plate is provided with a second inclined surface inclining with respect to the circumference direction toward the radial direction, the first coupling plate meshes with the tooth of the input gear due to a first coupling compelling portion relatively pressing the first inclined surface in a webbing drawing direction, and the second coupling plate meshes with the tooth of the input gear due to a second coupling compelling portion relatively pressing the second inclined surface in a webbing winding direction.

In a webbing winding device of an eighth aspect of the present invention according to the first aspect, the device is provided with a pair of first coupling members and a pair of second coupling members.

In a webbing winding device of a ninth aspect of the present invention according to the eighth aspect, the plurality of teeth are formed at the outer peripheral portion of the input gear by a constant pitch, number of the teeth being set to an odd number, when one of the first coupling members abuts on one of the teeth of odd number, the other of the first coupling members does not abut on another of the teeth of odd number, and when one of the second coupling members abuts on one of the teeth of odd number, the other of the second coupling members does not abut on another of the teeth of odd number.

A tenth aspect of the present invention is a a webbing winding device comprising: a winding shaft, at which a base end of a long belt-form webbing belt for restraining a body of a vehicle occupant is anchored, and which rotates in a winding direction around a shaft center thereof for winding the webbing belt at an outer peripheral portion thereof, and rotates in a drawing out direction, which is opposite to the winding direction, when the webbing belt is drawn out; an input gear which is mechanically coupled to the winding shaft, the input gear rotating for rotating the winding shaft, and a plurality of teeth being formed at an outer peripheral portion of the input gear; a motor side rotating body directly or indirectly coupled to a driving section, the motor side rotating body rotating by receiving driving force of the driving section; at least one first coupling member which rotates about an axis of the input gear in conjunction with rotation of the motor side rotating body, and is moveable toward and away from the teeth of the input gear in conjunction with rotation of the motor side rotating body one way about an axis thereof, the first coupling member meshing with the input gear by moving toward the teeth, transmitting the rotation the one way about the axis of the motor side rotating body to the input gear, and rotating the input gear in the winding direction; at least one second coupling member which rotates about the axis of the input gear in conjunction with the rotation of the motor side rotating body, and is moveable toward and away from the teeth of the input gear in conjunction with rotation of the motor side rotating body the other way about the axis thereof, the second coupling member meshing with the input gear by moving toward the teeth, transmitting the rotation the other way about the axis of the motor side rotating body to the input gear, and rotating the input gear in the drawing out direction; an inertial mass body provided to be coaxial and relatively rotatable with respect to the motor side rotating body, the first coupling member and the second coupling member being supported at the inertial mass body to be moveable toward and away from the input gear; coupling compelling portions integrally provided at the inertial mass body, the coupling compelling portion moving the first coupling member toward the teeth of the input gear in conjunction with relative rotation, with respect to the motor side rotating body, of the inertial mass body the other way about the axis of the motor side rotating body, and moving the second coupling member toward the teeth of the input gear in conjunction with relative rotation, with respect to the motor side rotating body, of the inertial mass body the one way about the axis of the motor side rotating body; and an urging section for, in accordance with the rotation of the motor side rotating body, urging the inertial mass body in the direction of the rotation of the motor side rotating body and causing the inertial mass body to rotate to follow the motor side rotating body.

DETAILED DESCRIPTION OF THE INVENTION

Structure of Present Embodiment

Overall Structure of Webbing Winding Device 10

Figure 5:
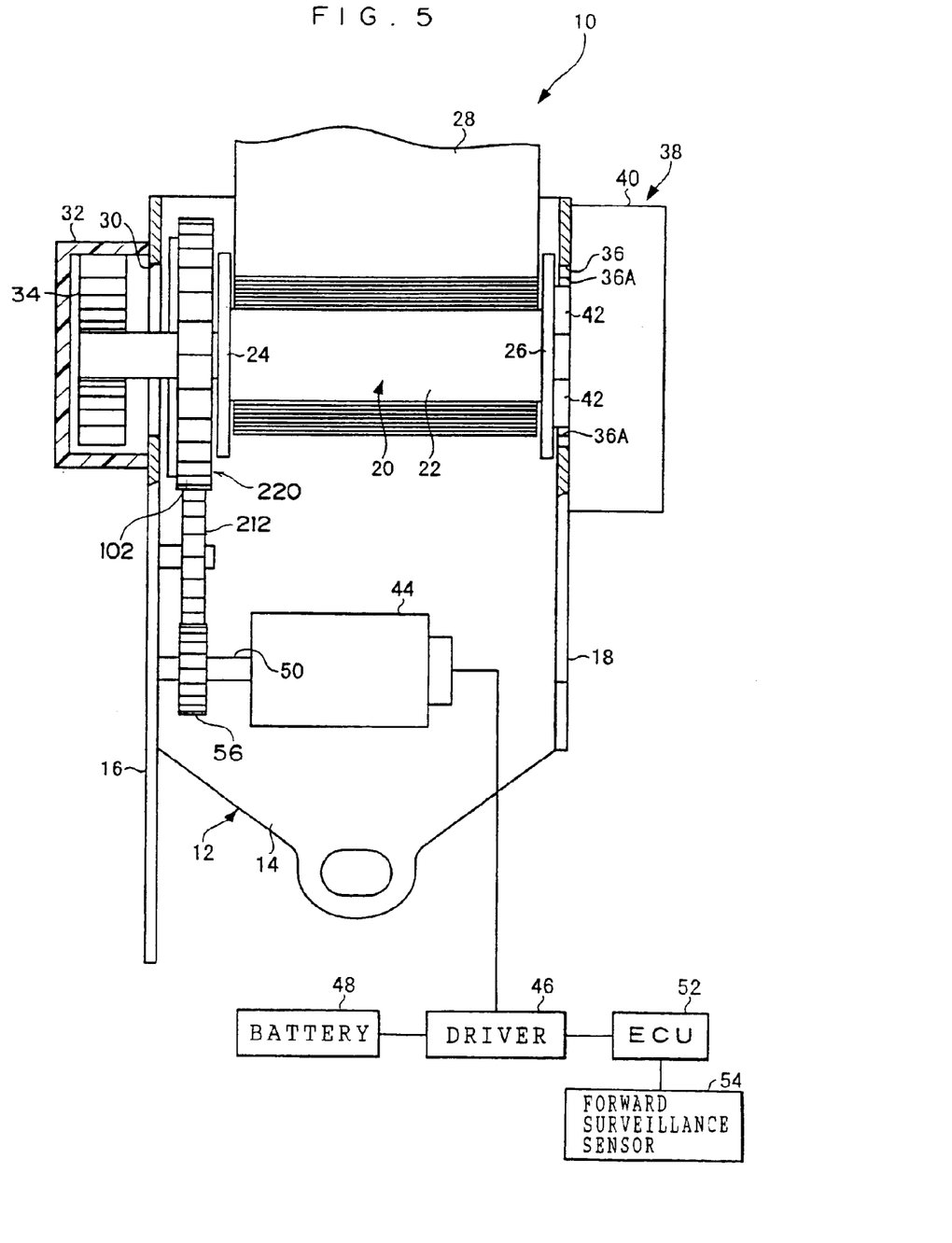
FIG. 5 is an elevational view showing general overall structure of the webbing winding device relating to the embodiment of the present invention.

FIG. 5 shows a sectional view illustrating overall structure of a webbing winding device 10 relating to the present embodiment. As shown in FIG. 5, the webbing winding device 10 is provided with a frame 12. The frame 12 is provided with a substantially plate-form back plate 14. The back plate 14 is fixed to a vehicle body by unillustrated fastening section such as a bolt or the like. Thus, this webbing winding device 10 is structured to be attached to the vehicle body. From two ends of the back plate 14 in a width direction thereof, a pair of leg plates 16 and 18 extend in parallel with one another. A spool 20 is rotatably disposed at these leg plates 16 and 18. The spool 20 is fabricated by die-casting or the like, and serves as a winding shaft.

The spool 20 is structured by a substantially cylindrical spool main body 22 and a pair of flange portions 24 and 26, which are respectively formed in substantially circular disc shapes at two end portions of the spool main body 22. Thus, the spool 20 forms a drum shape overall.

At the spool main body 22, a base end portion of a webbing belt 28 formed in a long belt shape is fixed between the flange portion 24 and the flange portion 26. When the spool 20 rotates one way around an axis thereof, the webbing belt 28 is wound, from a base end portion thereof, onto an outer peripheral portion of the spool main body 22 in a layered form. When the webbing belt 28 is drawn out, from a distal end side thereof, the webbing belt 28 that has been wound on the outer peripheral portion of the spool main body 22 is drawn out. In accordance therewith, the spool 20 rotates in the opposite direction to the direction of rotation when the webbing belt 28 was wound on (which is herebelow referred to as "the winding direction" for the sake of convenience). (Herebelow, the direction of rotation of the spool 20 when the webbing belt 28 is drawn out is referred to as "the drawing direction", for the sake of convenience.)

At a side of the flange portion 24 which is opposite to a side thereof at which the flange portion 26 is disposed, one end of the spool 20 passes through a round hole 30, which is formed in the leg plate 16, substantially coaxially with the round hole 30 and protrudes to outside the frame 12. A case 32 is disposed at an outer side of the leg plate 16 side of the frame 12. The case 32 is disposed to face the leg plate 16 along the axial direction of the spool 20, and is fixed to the leg plate 16. The case 32 is wholly open toward the leg plate 16 side thereof. The one end of the spool 20 that is passed through the round hole 30 enters into an inner side of the case 32, and is rotatably supported by the case 32.

A spiral spring 34 is disposed at an interior of the case 32. An end portion at a spiral direction outer side of the spiral spring 34 is anchored at the case 32. An end portion at the spiral direction inner side of the spiral spring 34 is anchored at the spool 20. When the spool 20 is rotated in the drawing direction, from a neutral state in which no particular load is applied to the spiral spring 34, a winding direction urging force is generated in the spiral spring 34 and urges the spiral spring 34 in the winding direction. Thus, in basic terms, when a tension force applied to the webbing belt 28 for drawing the webbing belt 28 from the spool 20 is released, the urging force of the spiral spring 34 rotates the spool 20 in the winding direction. Thus, this structure winds the webbing belt 28 onto the spool 20.

At a side of the flange portion 26 which is opposite to a side thereof at which the flange portion 24 is disposed, another end of the spool 20 passes through a ratchet hole 36, at which inward teeth are formed in the leg plate 18, substantially coaxially with the ratchet hole 36 and protrudes to the exterior of the frame 12. A lock mechanism 38 is disposed at an outer side of the leg plate 18 side of the frame 12. The lock mechanism 38 is provided with a case 40. The case 40 is disposed to face the leg plate 18 along the axial direction of the spool 20, and is fixed to the leg plate 18.

At an inner side of the case 40, principal elements structuring the lock mechanism 38, such as an unillustrated inertial plate, external gear, acceleration sensor and the like, are accommodated. At this structure, if the spool 20 suddenly rotates in the winding direction, the inertial plate in the case 40 rotates relatively with respect to the spool 20, and if the acceleration sensor detects a state of rapid deceleration of the vehicle, the inertial plate in the case 40 is forcibly rotated relatively with respect to the spool 20.

A pair of lock plates 42 are provided inside the aforementioned ratchet hole 36. These lock plates 42 are supported at a lock base which is provided in the case 40 and rotates integrally with the spool 20. With this structure, when the inertial plate in the case 40 rotates relatively in the drawing direction with respect to the lock base, the lock plates 42 are guided by a guide portion, which is formed in the lock base, and approach an inner periphery portion of the ratchet hole 36. Hence, outward teeth formed at the lock plates 42 mesh with inward teeth formed at the inner periphery portion of the ratchet hole 36.

Thus, with this structure, when the outward teeth formed at the lock plates 42 mesh with the inward teeth formed at the inner periphery portion of the ratchet hole 36, rotation of the lock base in the drawing direction is restricted, and consequently rotation of the spool 20 is restricted.

A motor 44, which serves as driving section, is disposed between the leg plate 16 and the leg plate 18, downward of the spool 20. The motor 44 is electrically connected to a battery 48 mounted in the vehicle, via a driver 46. In this structure, when electric current flows to the motor 44 from the battery 48 via the driver 46, the motor 44 forward-rotates or reverse-rotates an output shaft 50. The driver 46 is connected to an ECU 52, which is structured by a microcomputer or the like, and the ECU 52 is connected to a forward surveillance sensor 54.

The forward surveillance sensor 54 is disposed at a vicinity of a front end portion of the vehicle. The forward surveillance sensor 54 radiates an infra-red ray to frontward of the vehicle, and collects the infra-red ray subsequent to reflection thereof from another vehicle (running or stationary), an obstacle or the like frontward of the vehicle (herebelow, for the sake of convenience, the term "obstacle" includes running and stationary vehicles). On the basis of a time taken from when the forward surveillance sensor 54 emitted the infra-red light ray to when the forward surveillance sensor 54 collected the infra-red ray, the ECU 52 calculates a distance forward to the obstacle.

The ECU 52 operates the driver 46 on the basis of electrical signals outputted from the forward surveillance sensor 54, and thus controls the motor 44.

A gear 56 is coaxially and integrally provided at a distal end portion of the output shaft 50 of the 44. A radial direction outer side of the gear 56 meshes with a gear 212, which is rotatably supported at the frame 12. The gear 212 has a greater number of teeth than the gear 56. Thus, rotation of the gear 56 is transmitted to the gear 212 and made slower thereby.

Structure of Clutch 220

A clutch 220 is provided sideward of the gear 212 in a radial direction thereof. Herebelow, the clutch 220 will be described using FIGS. 1 to 4, which relate to the clutch 220.

Figure 1:
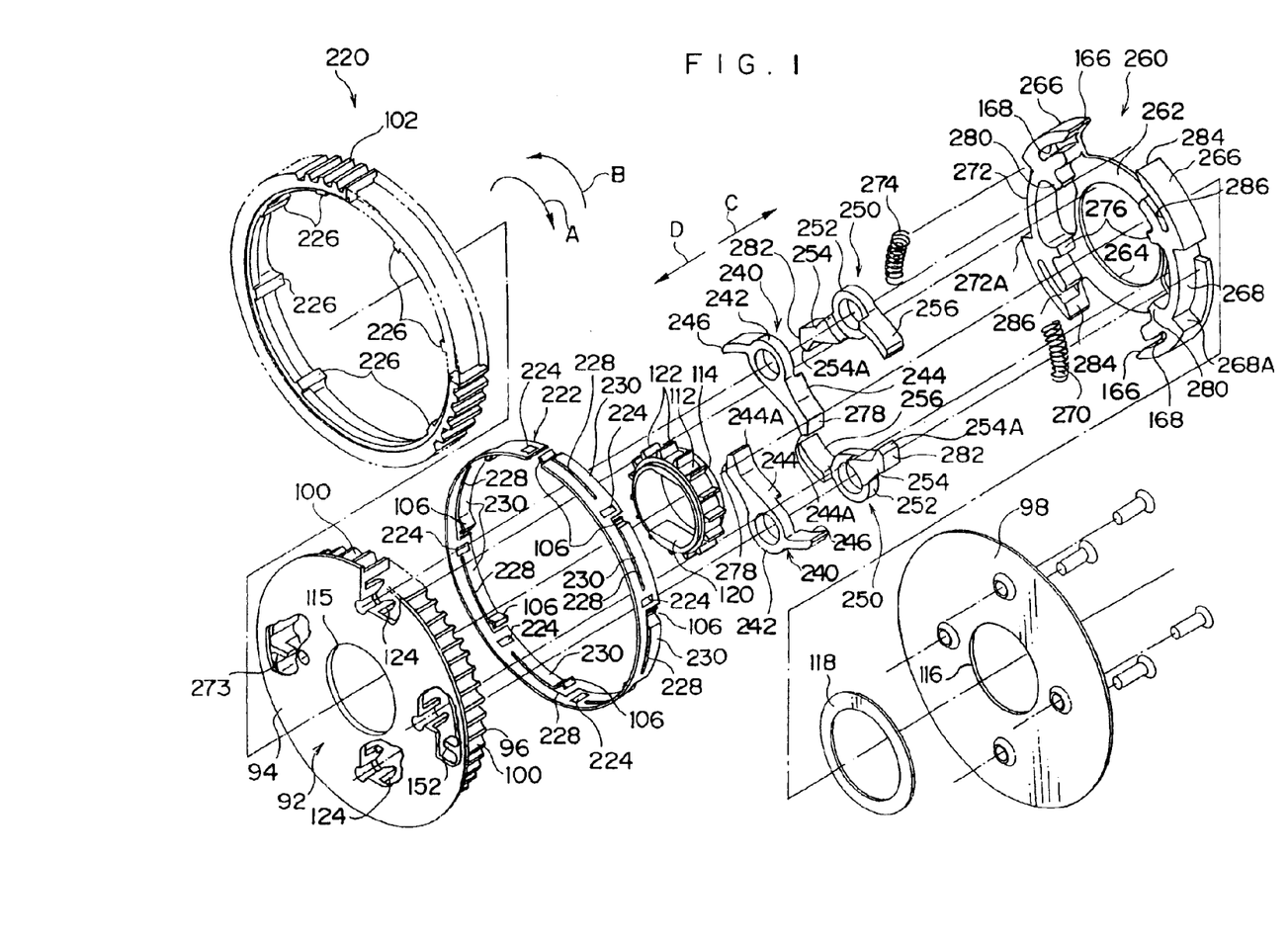
FIG. 1 is an exploded perspective view showing structure of a principal element (a clutch) of a webbing winding device relating to an embodiment of the present invention.

As shown in FIG. 1, the clutch 220 is provided with a base plate 92. At the base plate 92, a substantially ring-shaped peripheral wall 96 is formed along an outer peripheral portion of a circular disc-form base portion 94. Thus, the base plate 92 is formed in a tubular shape with a bottom (or a shallow-bottomed tray shape), and a dimension of this tubular shape in an axial direction thereof is extremely short. At an opening end at one end side in the axial direction of the base plate 92 (the side shown by the direction of an arrow C in FIG. 1), a circular disc-form cover 98 is attached. The cover 98 basically closes off the open end of the base plate 92.

Engaging recess portions 100 are formed at an outer peripheral portion of the peripheral wall 96, at a certain spacing along a peripheral direction thereof. At the outer side of the peripheral wall 96, an external gear (external cogwheel) 102 is disposed coaxially with the base plate 92. The external gear 102 serves as a motor side rotating body, and is formed substantially in a ring shape, with a significantly greater number of teeth than the gear 212. An internal diametric dimension of the external gear 102 is significantly greater than an external diametric dimension of the peripheral wall 96, and an annular gap is formed between an inner peripheral portion of the external gear 102 and the outer peripheral portion of the peripheral wall 96. A torque limiter 222 is disposed in this annular gap.

The torque limiter 222 is formed substantially in a ring shape as a whole, of a metal or the like having resilience. A thickness direction of the torque limiter 222 is set to be along a radial direction thereof. Engaging holes 224, which pass through the torque limiter 222 in this thickness direction, are formed at a predetermined spacing along the torque limiter 222 (in the present embodiment, at intervals of substantially 45 degrees about a center of the torque limiter 222).

Engaging protrusions 226, which are formed at a certain spacing at the inner peripheral portion of the external gear 102, enter into the engaging holes 224. Thus, when the external gear 102 acts to rotate relative to the torque limiter 222, inner peripheral portions of the engaging holes 224 interfere with the engaging protrusions 226, and relative rotation of the external gear 102 with respect to the torque limiter 222 is limited. (That is, in essence, the torque limiter 222 and the external gear 102 are coupled to be substantially integral.)

A plurality of incisions 228 are formed in the torque limiter 222 at a certain spacing along the peripheral direction of the torque limiter 222. One ends of these incisions 228 are positioned substantially at an axial direction midpoint (substantially at a width direction midpoint) of the torque limiter 222, and a length direction of the incisions 228 runs along the peripheral direction of the torque limiter 222. At the other end sides in the length direction of the incisions 228, the incisions 228 are inflected substantially by a right angle, and the other ends are formed such that long directions thereof run along the axial direction of the torque limiter 222. Hence, the other ends of the incisions 228 open out at one axial direction end (one width direction end) of the torque limiter 222.

Because the incisions 228 are formed as described above, at the one end side relative to an axial direction central portion of the torque limiter 222, spring plates 230 are formed plurally around the center of the torque limiter 222. Base end portions of the spring plates 230 at the one end sides of the incisions 228 are continuous with a main body portion of the torque limiter 222, and distal end sides of the spring plates 230 are free ends.

Engaging portions 106 are formed at the distal ends of the spring plates 230. The engaging portions 106 are inflectedly formed so as to protrude toward a radial direction center side of the torque limiter 222. The engaging portions 106 correspond with the plurality of engaging recess portions 100 formed at the peripheral wall 96 (of the base plate 92) described above. In a state in which the peripheral wall 96 is positioned substantially coaxially at the inner side of the external gear 102, each of the engaging portions 106 enters into any of the plurality of engaging recess portions 100.

Because the engaging protrusions 226 enter into the engaging holes 224 as described above, when the external gear 102 acts to rotate relatively with respect to the base plate 92, about the axial center of the base plate 92, the torque limiter 222 naturally acts to rotate integrally with the external gear 102.

However, because the engaging portions 106 of the spring plates 230 enter into the engaging recess portions 100, when the engaging portions 106 act to rotate along the peripheral direction of the peripheral wall 96, the engaging recess portions 100 interfere with the engaging portions 106, and the rotation of the engaging portions 106 is limited. Thus, relative rotation of the external gear 102 with respect to the base plate 92 is restricted. Basically, in this structure, the external gear 102 and the base plate 92 are integrally coupled.

Further, as described above, because the torque limiter 222 is formed by the metal or the like having resilience, the spring plates 230 naturally also have resilience. Therefore, if a rotating force generated by relative rotation of the external gear 102 with respect to the base plate 92 is large enough to counteract spring force (urging force) of the spring plates 230 and disengage the engaging portions 106 from the engaging recess portions 100, hindrance of the engaging portions 106 by the engaging recess portions 100 is released. Consequently, this structure enables relative rotation of the external gear 102 with respect to the base plate 92.

Meanwhile, at the inner side of the aforementioned base plate 92, an adaptor 112 is disposed substantially coaxially with the base plate 92. The adaptor 112 has a substantially tubular shape and serves as an input gear. An axial direction other end (at a side in the direction of an arrow D in FIG. 1) of the adaptor 112 is wholly rotatably supported at the round hole 30, which is formed at the center of the base portion 94 (of the base plate 92). A circular tube-form tube portion 114, which is formed coaxially at one end of the adaptor 112, is rotatably supported at a round hole 116, which is formed in the cover 98.

A fitting hole 120 is formed in the adaptor 112. The fitting hole 120 passes through the adaptor 112 along the axial direction thereof. An axial direction other end of the aforementioned spool 20 is fitted in the fitting hole 120, and the adaptor 112 and the spool 20 are coaxially and integrally coupled. A plurality, which is an odd number, of outward teeth 122, are formed with a certain spacing at an outer peripheral portion of the adaptor 112.

At a radial direction outer side of the adaptor 112, a pair of bosses 124 is formed at the base portion 94 of the base plate 92. Each of the bosses 124 is formed in a substantially circular tube shape, and is provided standing toward the axial direction one side from the base portion 94. These bosses 124 are formed so as to face one another across the round hole 30. A pawl 240, which serves as a first coupling member, is provided at each of the bosses 124.

Each of the pawls 240 is provided with a main body 242. The main body 242 is formed in a ring shape with an internal diametric dimension very slightly larger than an external diametric dimension of the boss 124. The boss 124 is fitted into the main body 242 such that the boss 124 passes through the main body 242. Thus, the pawl 240 is supported to be rotatable about the boss 124. A coupling plate 244 is formed at a portion of an outer periphery of the main body 242.

A dimension of the coupling plate 244 along the axial direction of the main body 242 is significantly larger than the same dimension of the main body 242. At a face of the pawl 240 at a side facing the base portion 94, the coupling plate 244 and the main body 242 are substantially coplanar. At a face of the pawl 240 at a side which is opposite to the side facing the base portion 94, the coupling plate 244 protrudes further than the main body 242 toward a direction opposite to the base plate 92 (a direction indicated by an arrow C). Thus, because the coupling plate 244 has the dimension longer than the main body 242 along the axial direction of the main body 242, the coupling plate 244 substantially has a tongue plate form with a length direction along the direction of protrusion thereof, and a width direction along the axial direction of the main body 242.

The coupling plate 244 is formed so as to extend to a winding direction side of the spool 20 relative to the main body 242 (the side of an arrow A in FIGS. 1 to 4) in the state in which the main body 242 is supported at the boss 124. Further, the coupling plate 244 is formed such that, if the coupling plate 244 rotates about the boss 124 through a predetermined angle in the winding direction, an angled portion at a distal end 244A of the coupling plate 244 abuts against the outer peripheral portion of the above-described adaptor 112, between one and another of the outward teeth 122 of the adaptor 112. The distal end 244A of the coupling plate 244 has an inclined surface which is inclined to correspond to drawing direction side (the direction of an arrow B in FIGS. 1 to 4) surfaces of the teeth of the adaptor 112. Thus, with this structure, the distal end 244A abuts against and obstructs the outward teeth 122, and rotation of the adaptor 112 in the drawing direction is restricted.

Here, the bosses 124 are formed so as to oppose one another across the round hole 30, as described above. Therefore, in a state in which the respective angled portions of the distal ends 244A of the two pawls 240, which are essentially substantially the same, are in contact with the outer peripheral surface of the adaptor 112, the distal end 244A of one of the pawls 240 is positioned at an opposite side of the axial center of the adaptor 112 from the distal end 244A of the other pawl 240. Accordingly, with this structure, if the total number of the outward teeth 122 at the outer peripheral portion of the adaptor 112 was an even number, any one of the outward teeth 122 would be formed at the opposite side of the axial center of the adaptor 112 from another of the outward teeth 122 (the axial center of the adaptor 112 were located at a center between two outward teeth 122), the distal ends 244A of the two pawls 240 could abut against the outward teeth 122 at the same time.

However, in the present embodiment, the total number of the outward teeth 122 formed at the outer peripheral portion of the adaptor 112 is, as described above, an odd number. Therefore, in the state in which the distal end 244A of one of the pawls 240 abuts against one of the outward teeth 122, the distal end 244A of the other pawl 240 is separated from the outward teeth 122 along the peripheral direction of the adaptor 112 (that is, the distal end 244A of the other pawl 240 is not in contact with the outward teeth 122).

A release plate 246 also protrudes from the outer peripheral portion of each main body 242. The release plate 246 is formed approximately at the opposite side of the main body 242 from the side thereof at which the coupling plate 244 is formed. Toward a distal end side of the release plate 246, the release plate 246 gradually curves toward a side of the axial center of the base plate 92. When the release plate 246 is rotated in the drawing direction, the coupling plate 244 rotates in a direction of separating from the outer peripheral portion of the adaptor 112. Similarly to the coupling plate 244: a dimension of the release plate 246 along the axial direction of the main body 242 is greater than that of the main body 242; the main body 242 and the release plate 246 are coplanar at the base portion 94 side thereof; and the release plate 246 protrudes further than the main body 242 to the side opposite the side thereof at which the base portion 94 is disposed.

Meanwhile, at a distal end side of each boss 124, beyond the main body 242 of the pawl 240, a main body 252 of a pawl 250, which serves as a second coupling member, is supported to be rotatable about the boss 124. The pawls 250 respectively have essentially the same structure as the pawls 240, and have structures in which a coupling plate 254 and a release plate 256, whose dimensions along the axial direction of the main body 252 are larger than the same dimension of the main body 252, protrude from an outer peripheral portion of the main body 252. However, differently from the pawls 240, the coupling plate 254 of each pawl 250 is formed at the drawing direction side relative to the main body 252 in the state in which the main body 252 is supported at the boss 124, and the release plate 256 is formed at the winding direction side in this state.

Differently from the pawls 240, each of the pawls 250 has a structure in which the coupling plate 254 and release plate 256 are coplanar with the main body 252 at a side thereof opposite to a side facing the base portion 94, and the coupling plate 254 and release plate 256 protrude further than the main body 252 to the base portion 94 side thereof. Accordingly, if the coupling plate 254 is rotated about the boss 124 by a predetermined angle in the drawing direction, an angled portion of a distal end 254A of the coupling plate 254 abuts against the outer peripheral portion of the adaptor 112 between one and another of the outward teeth 122. Hence, when the distal end 254A is in contact with a winding direction side face of one of the outward teeth 122, rotation of the adaptor 112 in the winding direction is restricted.

The clutch 220 is further provided with an inertial plate 260, which serves as an inertial mass body. The inertial plate 260 is provided with a substantially plate-like base portion 262, whose thickness direction is set to be along the axial direction of the base plate 92 and the adaptor 112. A round hole 264 is formed in the base portion 262. An internal diametric dimension of the round hole 264 is very slightly larger than an external diametric dimension of the tube portion 114, which is formed coaxially with respect to the outer peripheral portion of the adaptor 112 at the axial direction one end side of the adaptor 112. By assembly such that the tube portion 114 passes through the round hole 264, the base portion 262, and hence the inertial plate 260, is supported at the adaptor 112 to be rotatable about the adaptor 112.

A pair of blocks 266 is formed at the base portion 94 side of the base portion 262. These blocks 266 are formed so as to oppose one another across the round hole 264. One of the aforementioned bosses 124 is disposed in a gap between the pair of blocks 266 at an outer side of the round hole 264. The other boss 124 is disposed in another gap between the pair of blocks 266, at a side of the round hole 264 which is opposite to the side thereof at which the gap mentioned above is formed.

A spring accommodation portion 268 is formed at an outer peripheral portion of one of the pair of blocks 266 (at an outer side face, in a radial direction of the round hole 264, of the block 266). A compression coil spring 270, which serves as urging section, is accommodated at the spring accommodation portion 268.

The compression coil spring 270 is accommodated at the spring accommodation portion 268 in a state such that the compression coil spring 270 is curved peripherally to the center of the round hole 264. An end portion of the compression coil spring 270 at the winding direction side thereof abuts against a wall portion 268A of the spring accommodation portion 268. An end portion of the compression coil spring 270 at the drawing direction side thereof abuts against an abutting wall 152. The abutting wall 152 protrudes from an inner periphery portion of the peripheral wall 96 of the base plate 92 and enters into the spring accommodation portion 268.

Because the inertial plate 260 is rotatably supported at the tube portion 114 of the adaptor 112, in basic terms, the adaptor 112 is also relatively rotatable with respect to the base plate 92. However, as described above, because the winding direction side end portion of the compression coil spring 270 abuts against the wall portion 268A of the spring accommodation portion 268 and the drawing direction side end portion of the same abuts against the abutting wall 152 of the base plate 92, if the base plate 92 starts to rotate relatively in the winding direction relative to the inertial plate 260, the abutting wall 152 pushes the inertial plate 260 in the winding direction via the compression coil spring 270, and the inertial plate 260 rotates to follow the rotation of the base plate 92.

Therefore, as long as a large rotation force capable of overcoming the urging force of the compression coil spring 270 does not act on the inertial plate 260, relative rotation of the base plate 92 in the winding direction relative to the inertial plate 260 is limited.

Meanwhile, a spring accommodation portion 272 is formed at an outer peripheral portion of the other of the pair of blocks 266 (at an outer side face, in a radial direction of the round hole 264, of the block 266). A compression coil spring 274, which also serves as the urging section, is accommodated at the spring accommodation portion 272. The spring accommodation portion 272, the compression coil spring 274 and an abutting wall 272A are provided symmetrically with the spring accommodation portion 268, the compression coil spring 270 and the abutting wall 152 with respect to the center of the round hole 264.

Consequently, if the base plate 92 rotates about the adaptor 112 in the drawing direction, the compression coil spring 274 rotates the inertial plate 260 in the drawing direction, by urging force of the compression coil spring 274, so as to follow the base plate 92.

Thus, the urging forces of the compression coil spring 270 and the compression coil spring 274 on the inertial plate 260 act in opposite directions around the center of the base plate 92 and the inertial plate 260. Consequently, a rotational position of the inertial plate 260 relative to the base plate 92 is usually maintained at a position at which the urging forces of the compression coil spring 270 and the compression coil spring 274 balance out.

As shown in FIG. 1, pushing portions 276, which serve as coupling compelling section, are formed at inner peripheral portions of the blocks 266. These pushing portions 276 are formed at winding direction sides of the pawls 240. An inclined surface 278 is formed at a width direction outer end of the coupling plate 244 of each pawl 240, to correspond with the pushing portion 276. The inclined surface 278 is inclined toward the radial direction outer side of the base plate 92 with respect to the winding direction. In the state in which the distal end 244A is not in contact with the outer peripheral portion of the adaptor 112, the inclined surface 278 faces the pushing portion 276 along the peripheral direction of the base plate 92 and inertial plate 260.

The pushing portion 276 is formed so as to abut against the inclined surface 278 when the base plate 92 relatively rotates in the winding direction by a predetermined amount with respect to the inertial plate 260. When the base plate 92 starts to rotate further in the winding direction with respect to the inertial plate 260 from this abutting state, the inclined surface 278 is pushed in the drawing direction by the pushing portion 276, and this pushing force rotates the pawl 240 in the winding direction about the boss 124.

Pushing portions 280, which also serve as the coupling compelling section, are formed at inner peripheral portions of the blocks 266. These pushing portions 280 are formed at sides of central portions of the blocks 266 which are opposite, along the peripheral direction of the inertial plate 260, to sides thereof at which the pushing portions 276 are formed. The pushing portions 280 are formed at drawing direction sides of the pawls 250. An inclined surface 282 is formed at a width direction outer end of the coupling plate 254 of each pawl 250, to correspond with the pushing portion 280.

The inclined surface 282 is inclined toward the radial direction outer side of the base plate 92 with respect to the drawing direction. In the state in which the distal end 254A is not in contact with the outer peripheral portion of the adaptor 112, the inclined surface 282 faces the pushing portion 280 along the peripheral direction of the base plate 92 and inertial plate 260. The pushing portion 280 is formed so as to abut against the inclined surface 282 when the base plate 92 relatively rotates in the drawing direction by a predetermined amount with respect to the inertial plate 260. When the base plate 92 starts to rotate further in the drawing direction with respect to the inertial plate 260 from this abutting state, the inclined surface 282 is pushed in the winding direction by the pushing portion 280, and this pushing force rotates the pawl 250 in the drawing direction about the boss 124.

A pushing portion 166 is formed at a drawing direction side end portion, along the peripheral direction of the inertial plate 260, of each of the blocks 266, and a release plate accommodation portion 168 is formed at the inertial plate 260 axial center side relative to the pushing portion 166. The pushing portion 166 is formed to correspond, along the peripheral direction of the inertial plate 260, with the release plate 246 of the corresponding pawl 240.

From a portion of the release plate 246 that is joined with the main body 242 (a base end portion) toward a distal end side of the release plate 246, the release plate 246 is gradually curved towards the base plate 92 axial center side. A width direction outer side face of the release plate 246 is curved in the same way. Accordingly, if the base plate 92 relatively rotates by a predetermined amount in the drawing direction relative to the inertial plate 260, the pushing portion 166 abuts against the width direction outer side face of the release plate 246. From this state, if the base plate 92 relatively rotates further in the drawing direction with respect to the inertial plate 260, the pushing portion 166 pushes the distal end portion of the release plate 246 in the winding direction.

Here, the distal end of the release plate 246 is set to be an inclined surface which is angled outward in the radial direction of the inertial plate 260 relative to the drawing direction. Accordingly, when the pushing portions 166 press the distal ends of the release plates 246, the pawls 240 are rotated about the bosses 124 in the drawing direction, and are guided to the release plate accommodation portions 168.

Correspondingly, a pushing portion 284 is formed at a winding direction sides end portion, along the peripheral direction of the inertial plate 260, of each of the blocks 266, and a release plate accommodation portion 286 is formed at the inertial plate 260 axial center side relative to the pushing portion 284. The pushing portion 284 and release plate accommodation portion 286 are formed to be symmetrical with the pushing portion 166 and release plate accommodation portion 168 about the peripheral direction center of the block 266. With this structure, when the pushing portions 284 abut against width direction outer side faces of the release plates 256 and push the release plates 256 in the drawing direction, the pawls 250 are rotated about the bosses 124 in the winding direction, and are guided to the release plate accommodation portions 286.

A spacer 118, which is formed of a synthetic resin material in a ring shape, is disposed between the base portion 262 of the inertial plate 260 and the base portion 94 of the base plate 92. The spacer 118 is supported at the tube portion 114 of the adaptor 112. An axial direction one end face of the spacer 118 abuts against the base portion 262 of the inertial plate 260, and an axial direction other end face of the spacer 118 abuts against an end face of a portion connecting the tube portion 114 with a main body portion of the adaptor 112.

At the clutch 220 with the structure described above, the aforementioned external gear 102 meshes with the gear 212.

Operations and Effects of the Present Embodiment

Basic Operations of the Webbing Winding Device 10

First, basic operations of the webbing winding device 10 will be described.

At this webbing winding device 10, from an accommodated state in which the webbing belt 28 is wound on the spool 20 in the layered form, when an unillustrated tongue plate is pulled and the webbing belt 28 is pulled, the webbing belt 28 is drawn out while the spool 20 is rotated in the drawing direction against the urging force of the spiral spring 34, which urges the spool in the winding direction.

Hence, in a state in which the webbing belt 28 has been drawn out, the webbing belt 28 is wrapped round the front of the body of the occupant sitting at the seat, and the tongue plate is inserted at an unillustrated buckle device. When the tongue plate is retained at the buckle device, the webbing belt 28 is in an applied state to the body of the occupant (herebelow, simply referred to as "the applied state").

When the webbing belt 28 is drawn out and the spool 20 is rotated in the drawing direction in order to apply the webbing belt 28, the spiral spring 34 is wound up and the urging force of the spiral spring 34 urging the spool 20 to the drawing direction side increases. Hence, in the applied state, the urging force of the spiral spring 34 acts so as to wind the webbing belt 28 onto the spool 20. Thus, in essence, the webbing belt 28 is closely fitted to the body of the occupant by this urging force, and the webbing belt restrains and holds the body of the occupant with a force corresponding to the urging force at this time.

When the retention of the tongue plate by the buckle device is released and the tongue plate is removed from the buckle device, force opposing the urging force of the spiral spring 34 to keep the webbing belt 28 in the drawn-out state is released. Consequently, the spool 20 is rotated in the winding direction by the urging force of the spiral spring 34. By this rotation of the spool 20 in the winding direction, the webbing belt 28 that had been drawn out is wound on at the outer peripheral portion of the spool 20 in the layered form, and thus the webbing belt 28 is accommodated.

Here, because the spool 20 is fitted to the adaptor 112 of the clutch 220, when the spool rotates to draw out or wind up the webbing belt 28, the adaptor 112 rotates. However, in this state, the adaptor 112 rotates alone. Because the base plate 92, the inertial plate 260 and the like do not rotate, the pawls 240 and the pawls 250 do not rotate, and hence the external gear 102 does not rotate. Therefore, the rotation of the spool 20 is not transmitted to the output shaft 50 of the motor 44 by the external gear 102, the gear 212 and the gear 56.

Operation of the Webbing Winding Device 10 at a Time of Approaching a Frontward Obstacle During running of the vehicle, the forward surveillance sensor 54 detects a distance frontward of the vehicle to an obstacle. An electric signal which includes a signal level corresponding to the distance to the obstacle is outputted from the forward surveillance sensor 54. The electric signal outputted from the forward surveillance sensor 54 is inputted to the ECU 52. At the ECU 52, it is judged, based on the electric signal from the forward surveillance sensor 54, whether or not the distance to the obstacle is less than a predetermined value. Then, if the ECU 52 has judged that the distance to the obstacle is less than the predetermined value, the ECU 52 outputs a control signal to the driver 46, and supplies electric current to the motor 44 via the driver 46.

Thus, the motor 44 is driven to forward-rotate at a speed of at least a predetermined value, and the output shaft 50 is forward-rotated. The rotation of the output shaft 50 is transmitted to the external gear 102 of the clutch 220 while being reduced in speed via the gears 56 and 212. Thus, the external gear 102 rotates in the winding direction at a rotation speed of at least a predetermined value. Because the external gear 102 is mechanically coupled with the base plate 92 via the torque limiter 222, when the external gear 102 rotates in the winding direction, the base plate 92 rotates in the winding direction integrally therewith.

When the base plate 92 rotates in the winding direction, the abutting wall 152 pushes the winding direction side end portion of the compression coil spring 270, and the compression coil spring 270 pushes the wall portion 268A of the spring accommodation portion 268 by the urging force thereof. Thus, the inertial plate 260 rotates to follow the base plate 92.

However, the inertial plate 260 basically acts to stay in the same place by inertia due to mass thereof. Therefore, when the base plate 92 is suddenly rotated at the speed of at least the predetermined value by the driving force of the motor 44, the base plate 92 relatively rotates in the winding direction relative to the inertial plate 260 (that is, against the urging force of the compression coil spring 270) before the urging force of the compression coil spring 270 causes the inertial plate 260 to rotate followingly.

Figure 3:
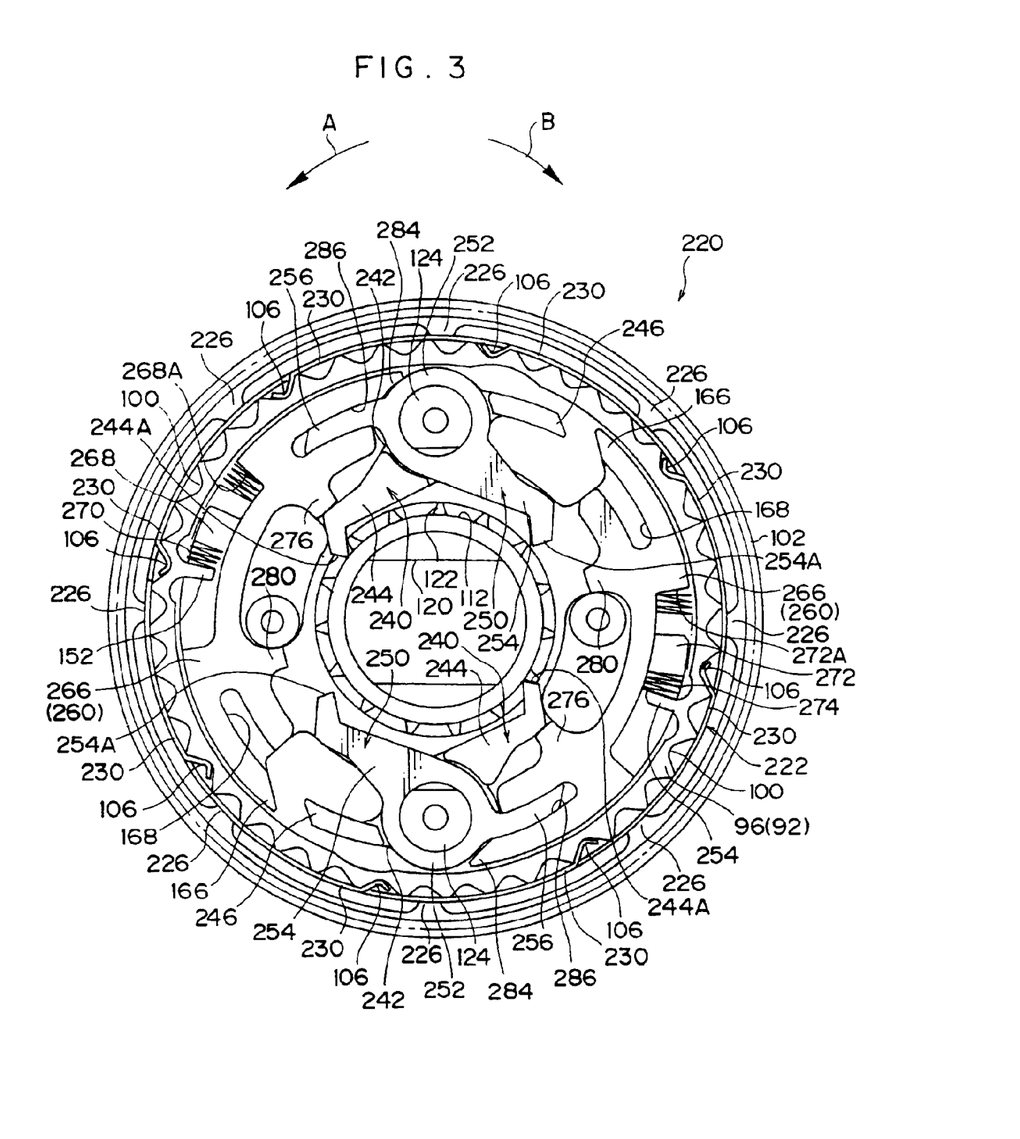
FIG. 3 is a plan view corresponding to FIG. 2, which shows a state in which rotation in a winding direction is transmitted.

When the base plate 92 relatively rotates by at least a predetermined amount in the winding direction relative to the inertial plate 260, the pushing portions 276, which are formed at the blocks 266 of the inertial plate 260, abut against the coupling plates 244 of the pawls 240. When, in this state, the base plate 92 acts to relatively rotate further in the winding direction with respect to the inertial plate 260, the pushing portions 276 press the inclined surfaces 278 of the coupling plates 244 in the drawing direction.

The pushing forces applied to the inclined surfaces 278 act both in the drawing direction and inward in the radial direction of the inertial plate 260 and base plate 92. The components that act inward in the radial direction cause the pawls 240 to rotate in the winding direction about the bosses 124. When the pawls 240 rotate about the bosses 124 in the winding direction, the angled portions of the distal ends 244A are abutted against the outer peripheral portion of the adaptor 112. In this state, the pawls 240 rotate in the winding direction about the center of the base plate 92, together with the base plate 92, until the angled portion of one of the distal ends 244A abuts against the nearest of the outward tooth 122 at the winding direction side of the angled portion.

Subsequently, from this state, when the distal end 244A abuts against this outward tooth 122 and the base plate 92 rotates further in the winding direction, the distal end 244A of the pawl 240 pushes the outward tooth 122 in the winding direction and the adaptor 112, along with the spool 20, is rotated in the winding direction. The webbing belt 28 is wound on at the spool 20 by this rotation. As a result, looseness of the webbing belt 28, known as "slack", is eliminated and a restraining force from the webbing belt 28 on the occupant's body is raised. Temporarily thereafter, even if the occupant carries out an operation of rapid control of the vehicle (emergency braking) and the vehicle enters a rapid deceleration state, the webbing belt 28 assuredly holds the body of the occupant.

Figure 2:
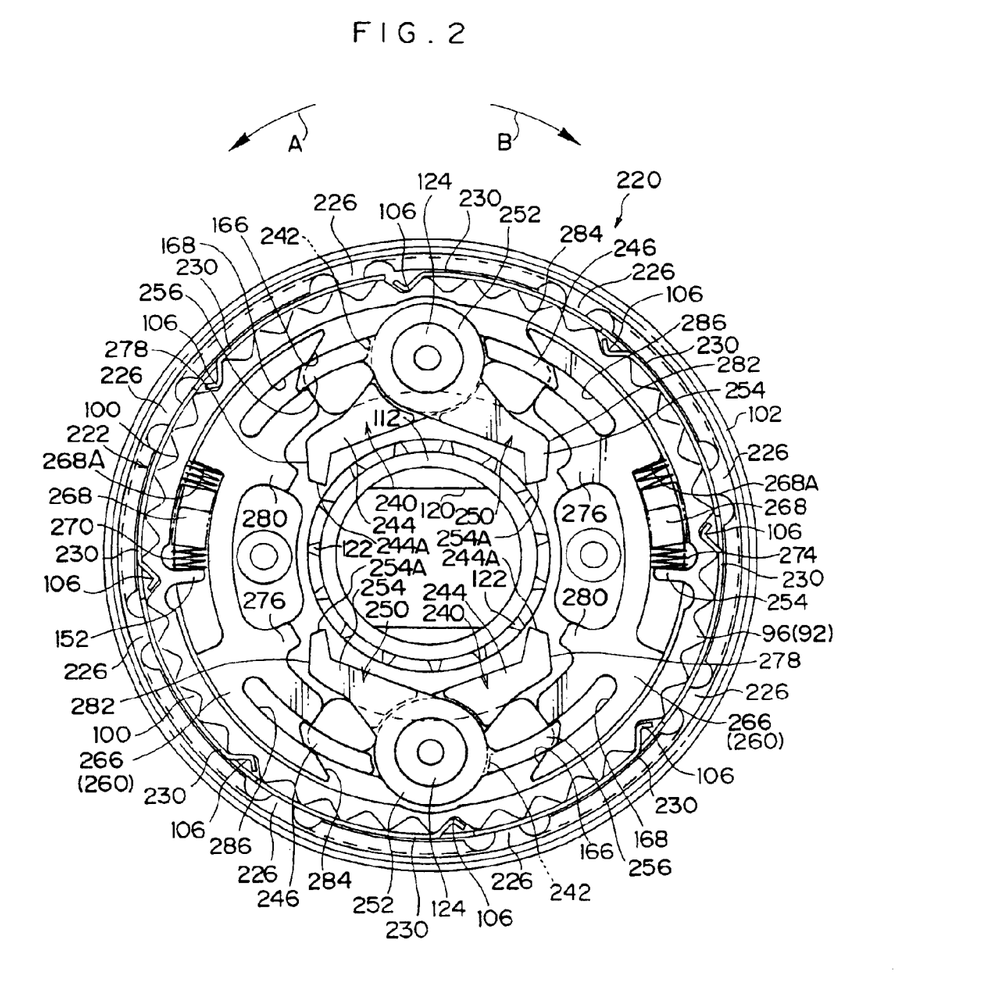
FIG. 2 is a plan view showing the structure of the principal element (the clutch) of the webbing winding device relating to the embodiment of the present invention.

When the motor 44 stops in this state, in which the slack has been eliminated thus, rotation of the base plate 92 in the winding direction is stopped. When the rotation of the base plate 92 stops, the compression coil spring 270 pushes the inertial plate 260 in the winding direction by the urging force thereof, and the inertial plate 260 rotates in the winding direction to the position at which the urging force of the compression coil spring 270 and the urging force of the compression coil spring 274 balance out.

When the inertial plate 260 rotates thus, the pushing portions 166 abut against the release plates 246 of the pawls 240 and push the release plates 246 in the winding direction. Because the release plates 246 are subjected to these pushing forces, the pawls 240 rotate in the drawing direction about the bosses 124, and the distal ends 244A of the coupling plates 244 are separated from the outer peripheral portion of the adaptor 112. As a result, the mechanical coupling of the base plate 92 with the adaptor 112, that is, the mechanical coupling of the output shaft 50 of the motor 44 with the spool 20, is released.

Now, in the present embodiment as described above, the total number of the outward teeth 122 of the adaptor 112 is set to an odd number. Thus, in the state in which the distal end 244A of one of the pawls 240 abuts against the outward teeth 122, the distal end 244A of the other pawl 240 is separated from the outward tooth 122 along the peripheral direction of the adaptor 112. Thus, the distal end 244A of the other pawl 240 is located at an intermediate portion along the peripheral direction of the adaptor 112, between the nearest thereto of the outward tooth 122 in the winding direction and the nearest thereto of the outward tooth 122 in the drawing direction. In other words, in the present embodiment, in the state in which the distal ends 244A of the both pawls 240 abut against the outer peripheral portion of the adaptor 112, a spacing between the distal end 244A of the one pawl 240 and the distal end 244A of the other pawl 240 is not an integer multiple of a pitch of the outward teeth 122.

Therefore, at the time at which both of the pawls 240 are rotating about the boss 124, if the distal end 244A of one of the pawls 240 abuts against a tooth peak of the outward tooth 122, the distal end 244A of the other pawl 240 will not abut against a tooth peak of the outward tooth 122, and the distal end 244A of the other pawl 240 will abut against the outer peripheral portion of the adaptor 112, between neighboring outward teeth 122 in the peripheral direction.

Therefore, even though the distal end 244A of the one pawl 240 is abutted against a tooth peak of the outward tooth 122 and cannot mesh with the outward teeth 122, the distal end 244A of the other pawl 240 will assuredly mesh with the outward tooth 122 when the base plate 92 has rotated by an amount corresponding to substantially half of the pitch of the outward teeth 122. Thus, the rotation of the base plate 92 can be quickly and assuredly transmitted to the adaptor 112, and the rotation force of the motor 44 can be transmitted to the spool 20.

When the rotating force of the motor 44 rotates the spool 20 in the winding direction as described above, the restraining force on the occupant's body from the webbing belt 28 is increased. However, in the state in which the spool 20 has wound up the webbing belt 28 until the slack is eliminated, the body of the occupant becomes a hindrance to the webbing belt 28 and, in basic terms, the spool 20 cannot wind the webbing belt 28 up further. In this state, if the spool 20 rotates further in the winding direction for winding up the webbing belt 28, the webbing belt 28 will constrict the body of the occupant with a greater force than required, which is not preferable.

Here, in a case in which the spool 20 starts to wind up the webbing belt 28 more than is required as described above, the body of the occupant becomes a hindrance to winding of the webbing belt 28, and a tension force is applied to the webbing belt 28 from the body of the occupant with a magnitude that corresponds to the winding force of the spool 20 winding up the webbing belt 28. This tension force acts in a direction opposite to the direction in which the spool 20 winds the webbing belt 28. Therefore, when such tension force is applied to the webbing belt 28, the spool 20 stops.

In this state, because the rotation force of the motor 44 is applied to the spool 20 via the external gear 102, the base plate 92, the pawl 240 and the adaptor 112, in the state in which the spool 20 has stopped, the outward teeth 122 of the adaptor 112 limit rotation of the pawl 240 about the center of the base plate 92, and the pawl 240 limits rotation of the base plate 92 in the winding direction. Further, the base plate 92, via the torque limiter 222, limits rotation of the external gear 102 in the winding direction.

Here, in the state in which rotation of the external gear 102 is limited thus by the base plate 92 via the torque limiter 222, if the external gear 102 starts to rotate further in the winding direction, the rotation force at this time becomes more than the spring force of the spring plates 230 structuring the torque limiter 222, the engaging portions 106 of the spring plates 230 are disengaged from the engaging recess portions 100. As a result, the coupling of the base plate 92 with the external gear 102 is temporarily released, and the external gear 102 rotates in the winding direction until the engaging portions 106 enter into others of the engaging recess portions 100 (, which are adjacent to the engaging recess portions 100 mentioned above).

Thus, when the coupling of the base plate 92 and the external gear 102 is released, transmission of the rotation force of the external gear 102 to the base plate 92, that is, transmission of the rotation force of the motor 44 to the spool 20, is blocked. Therefore, an increase in the restraining force from the webbing belt 28 can be suppressed.

Operation of the Webbing Winding Device 10 at a Time of Ceasing Approaching an Obstacle A case in which an approach of the vehicle to an obstacle as described above is cancelled, that is, a case in which the vehicle decelerates or stops and a vehicle which is running at the front side gets further away or the like, will be described. In this state, an electric signal corresponding to the distance to the obstacle is outputted from the forward surveillance sensor 54 and inputted to the ECU 52. When the ECU 52 judges that the distance to the obstacle is not less than the predetermined value, the ECU 52 first confirms, from a memory or the like, whether or not the slack has been eliminated in a current state.

When the ECU 52 has judged that the distance to the obstacle is not less than the predetermined value and confirmed that the slack has been eliminated in the current state, the ECU 52 outputs a control signal to the driver 46, and supplies electric current to the motor 44 via the driver 46. In this case, the current flows in the opposite direction to the current that flowed for the case of eliminating the slack. Accordingly, the motor 44 reverse-rotates at a speed of at least a predetermined value, the output shaft 50 is reverse-rotated, and the external gear 102 is rotated in the drawing direction at a rotation speed of at least the predetermined value. The rotation of the external gear 102 in the drawing direction is transmitted to the base plate 92 via the torque limiter 222, and the base plate 92 is rotated in the drawing direction at a speed of at least a predetermined value.

Figure 4:
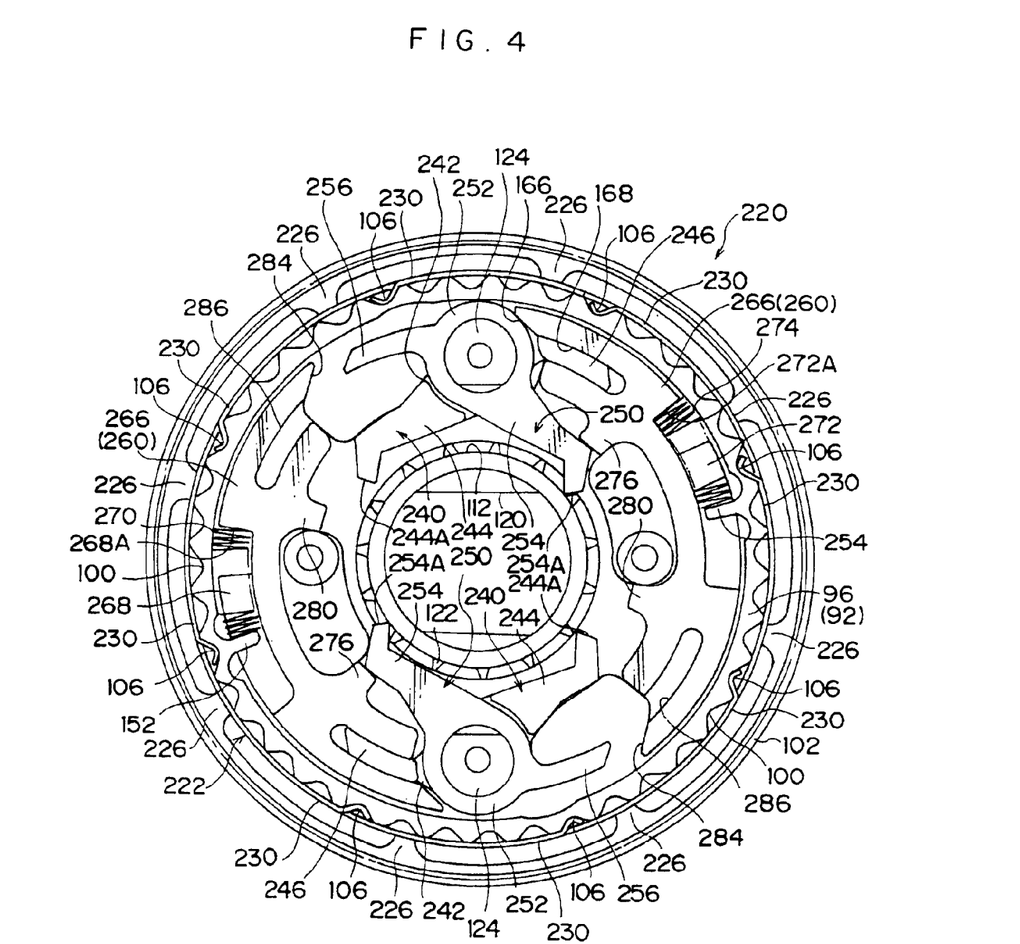
FIG. 4 is a plan view corresponding to FIG. 2, which shows a state in which rotation in a drawing out direction is transmitted.

In a similar manner to the case in which the base plate 92 rotates in the winding direction at the speed of at least the predetermined value, when the base plate 92 rotates in the drawing direction at the speed of at least the predetermined value, the base plate 92 rotates relatively in the drawing direction with respect to the inertial plate 260, which tends to stay still due to inertia. When the base plate 92 has relatively rotated by a predetermined amount in the drawing direction relative to the inertial plate 260, the pushing portions 280 formed at the blocks 266 of the inertial plate 260 abut against the coupling plates 254 of the pawls 250.

When, in this state, the base plate 92 starts to relatively rotate further in the drawing direction relative to the inertial plate 260, the pushing portions 280 press the inclined surfaces 282 of the coupling plates 254 in the winding direction. The pushing forces applied to the inclined surfaces 282 act both in the winding direction and inward in the radial direction of the inertial plate 260 and base plate 92, and the components that act inward in the radial direction cause the pawls 250 to rotate about the bosses 124 in the drawing direction.

When the pawls 250 rotate in the drawing direction about the bosses 124, the angled portions of the distal ends 254A abut against the outer peripheral portion of the adaptor 112. In this state, the pawls 250 rotate in the drawing direction about the center of the base plate 92, together with the base plate 92, until the angled portion of one of the distal ends 254A abuts against the nearest of the outward tooth 122 at the drawing direction side of the angled portion.

Subsequently, from this state, when the distal end 254A abuts against this outward tooth 122 and the base plate 92 rotates further in the drawing direction, the distal end 254A of the pawl 250 pushes the outward tooth 122 in the drawing direction and the adaptor 112, along with the spool 20, is rotated in the drawing direction. The tightened winding of the webbing belt 28 at the spool 20 is loosened by this rotation of the spool 20, and a sensation of pressure applied to the occupant's body by the webbing belt 28 is alleviated.

When the motor 44 stops in this state, rotation of the base plate 92 in the drawing direction is stopped. When the rotation of the base plate 92 stops, the compression coil spring 274 pushes the inertial plate 260 in the drawing direction by the urging force thereof, and the inertial plate 260 rotates in the drawing direction to the position at which the urging force of the compression coil spring 270 and the urging force of the compression coil spring 274 balance out.

When the inertial plate 260 rotates thus, the pushing portions 166 abut against the release plates 256 of the pawls 250, and push the release plates 256 in the drawing direction. Because the release plates 256 are subjected to these pushing forces, the pawls 250 rotate in the winding direction about the bosses 124, and the distal ends 254A of the coupling plates 254 are separated from the outer peripheral portion of the adaptor 112. As a result, the mechanical coupling of the base plate 92 with the adaptor 112, that is, the mechanical coupling of the output shaft 50 of the motor 44 with the spool 20, is released.

Thus, the clutch 220 of the webbing winding device 10 has a structure which can transmit rotation of the external gear 102 to the adaptor 112 and, in contrast, not transmit rotation from the adaptor 112 to the external gear 102, regardless of whether the rotation is in the winding direction or the drawing direction.

Therefore, the spool 20 can be rotated in either the winding direction or the drawing direction simply by forward-rotation driving or reverse-rotation driving of the motor 44 at a speed of at least a predetermined value. Accordingly, as described above, a restraining force from the webbing belt 28 can be increased in a case in which a distance between the vehicle and an obstacle has become small, and a sensation of pressure experienced because of the webbing belt 28 can be moderated when the separation between the vehicle and the obstacle has become large again.

Furthermore, the transmission of rotation in both directions is realized essentially by providing the pawls 240 for transmitting winding direction rotation and the pawls 250 for transmitting drawing direction rotation. Thus, the structure of the clutch 220 can be small and simple. As a result, a reduction in size of the webbing winding device 10 and a lowering of costs can be expected.

The present embodiment is a structure which applies reverse-rotation driving force of the motor 44 to rotation force of the spool 20 in the drawing direction for moderating the sensation of pressure from the webbing belt 28. However, structures are also possible which apply the reverse-rotation driving force of the motor 44 to rotation force of the spool 20 in the drawing direction for other purposes, such as, for example, assisting when the occupant is pulling on the webbing belt 28 at a time of applying the webbing belt 28, and the like.

As has been described above, according to the present invention, a first coupling member transmits rotation one way around an axis of a motor side rotating body to an input gear for rotating a winding shaft, and a second coupling member transmits rotation the other way around the axis of the motor side rotating body to the input gear for rotating the winding shaft. Thus, both forward-rotation and reverse-rotation of driving section can be transmitted to the winding shaft with a simple structure.

What is claimed is:

1. A webbing winding device comprising:
    a winding shaft, at which a base end of a long belt-form webbing belt for restraining a body of a vehicle occupant is anchored, and which rotates in a winding direction around a shaft center thereof for winding the webbing belt at an outer peripheral portion thereof, and rotates in a drawing out direction, which is opposite to the winding direction, when the webbing belt is drawn out;
    an input gear which is mechanically coupled to the winding shaft, the input gear rotating for rotating the winding shaft, and a plurality of teeth being formed at an outer peripheral portion of the input gear;
    a motor side rotating body directly or indirectly coupled to a driving section, the motor side rotating body rotating by receiving driving force of the driving section;
    at least one first coupling member which rotates about an axis of the input gear in conjunction with rotation of the motor side rotating body, and is moveable toward and away from the teeth of the input gear in conjunction with rotation of the motor side rotating body one way about an axis thereof, the first coupling member meshing with the input gear by moving toward the teeth, transmitting the rotation the one way about the axis of the motor side rotating body to the input gear, and rotating the input gear in the winding direction; and
    at least one second coupling member which rotates about the axis of the input gear in conjunction with the rotation of the motor side rotating body, and is moveable toward and away from the teeth of the input gear in conjunction with rotation of the motor side rotating body the other way about the axis thereof, the second coupling member meshing with the input gear by moving toward the teeth, transmitting the rotation the other way about the axis of the motor side rotating body to the input gear, and rotating the input gear in the drawing out direction.

2. The webbing winding device of claim 1, further comprising:
    an inertial mass body provided to be coaxial and relatively rotatable with respect to the motor side rotating body, the first coupling member and the second coupling member being supported at the inertial mass body to be moveable toward and away from the input gear;
    coupling compelling portions integrally provided at the inertial mass body, the coupling compelling portion moving the first coupling member toward the teeth of the input gear in conjunction with relative rotation, with respect to the motor side rotating body, of the inertial mass body the other way about the axis of the motor side rotating body, and moving the second coupling member toward the teeth of the input gear in conjunction with relative rotation, with respect to the motor side rotating body, of the inertial mass body the one way about the axis of the motor side rotating body; and
    an urging section for, in accordance with the rotation of the motor side rotating body, urging the inertial mass body in the direction of the rotation of the motor side rotating body and causing the inertial mass body to rotate to follow the motor side rotating body.

3. The webbing winding device of claim 2, wherein the first coupling member is provided with a first coupling plate for meshing with the tooth of the input gear and a first release plate for releasing meshing of the tooth of the input gear and the first coupling plate, and the second coupling member is provided with a second coupling plate for meshing with the tooth of the input gear and a second release plate for releasing meshing of the tooth of the input gear and the second coupling plate.

4. The webbing winding device of claim 3, wherein protruding direction of the first coupling plate is substantially opposite to that of the second coupling plate in a circumference direction of the motor side rotating body, and protruding direction of the first releasing plate is substantially opposite to that of the second releasing plate in the circumference direction.

5. The webbing winding device of claim 3, wherein the first coupling plate is provided with a first inclined surface inclining with respect to the circumference direction toward a radial direction of the motor side rotating body, and the second coupling plate is provided with a second inclined surface inclining with respect to the circumference direction toward the radial direction, the first coupling plate meshes with the tooth of the input gear due to a first coupling compelling portion relatively pressing the first inclined surface in a webbing drawing direction, and the second coupling plate meshes with the tooth of the input gear due to a second coupling compelling portion relatively pressing the second inclined surface in a webbing winding direction.

6. The webbing winding device of claim 1, wherein the motor side rotating body is a substantially ring-like external gear, the external gear being axially supported at the winding shaft to be coaxially relatively rotatable with respect to the winding shaft, a plurality of outward teeth being formed at an outer peripheral portion of the external gear, and the external gear being directly or indirectly connected to a drive gear which is rotated by the driving force of the driving section, the input gear is disposed at an inner side of the external gear and coaxially and integrally coupled with the winding shaft, the teeth of the input gear being formed at an outer peripheral portion of the input gear, and the external gear supports the first and the second coupling members, to be moveable toward and away from the input gear, between the external gear and the input gear in a radial direction of the external gear.

7. The webbing winding device of claim 1, wherein the motor side rotating body is a substantially ring-like external gear, the external gear being axially supported at the winding shaft to be coaxially relatively rotatable with respect to the winding shaft, a plurality of outward teeth being formed at an outer peripheral portion of the external gear, and the external gear being directly or indirectly connected to a drive gear which is rotated by the driving force of the driving section, the input gear is disposed at an inner side of the external gear and coaxially and integrally coupled with the winding shaft, the teeth of the input gear being formed at an outer peripheral portion of the input gear, and the external gear supports the first and the second coupling members, to be moveable toward and away from the input gear, between the external gear and the input gear in a radial direction of the external gear.

8. The webbing winding device of claim 1, wherein the device is provided with a pair of first coupling members and a pair of second coupling members.

9. The webbing winding device of claim 8, wherein the plurality of teeth are formed at the outer peripheral portion of the input gear by a constant pitch, number of the teeth being set to an odd number, when one of the first coupling members abuts on one of the teeth of odd number, the other of the first coupling members does not abut on another of the teeth of odd number, and when one of the second coupling members abuts on one of the teeth of odd number, the other of the second coupling members does not abut on another of the teeth of odd number.

10. A webbing winding device comprising:

a winding shaft, at which a base end of a long belt-form webbing belt for restraining a body of a vehicle occupant is anchored, and which rotates in a winding direction around a shaft center thereof for winding the webbing belt at an outer peripheral portion thereof, and rotates in a drawing out direction, which is opposite to the winding direction, when the webbing belt is drawn out;

an input gear which is mechanically coupled to the winding shaft, the input gear rotating for rotating the winding shaft, and a plurality of teeth being formed at an outer peripheral portion of the input gear;

a motor side rotating body directly or indirectly coupled to a driving section, the motor side rotating body rotating by receiving driving force of the driving section;

at least one first coupling member which rotates about an axis of the input gear in conjunction with rotation of the motor side rotating body, and is moveable toward and away from the teeth of the input gear in conjunction with rotation of the motor side rotating body one way about an axis thereof, the first coupling member meshing with the input gear by moving toward the teeth, transmitting the rotation the one way about the axis of the motor side rotating body to the input gear, and rotating the input gear in the winding direction;

at least one second coupling member which rotates about the axis of the input gear in conjunction with the rotation of the motor side rotating body, and is moveable toward and away from the teeth of the input gear in conjunction with rotation of the motor side rotating body the other way about the axis thereof, the second coupling member meshing with the input gear by moving toward the teeth, transmitting the rotation the other way about the axis of the motor side rotating body to the input gear, and rotating the input gear in the drawing out direction;

an inertial mass body provided to be coaxial and relatively rotatable with respect to the motor side rotating body, the first coupling member and the second coupling member being supported at the inertial mass body to be moveable toward and away from the input gear;

coupling compelling portions integrally provided at the inertial mass body, the coupling compelling portion moving the first coupling member toward the teeth of the input gear in conjunction with relative rotation, with respect to the motor side rotating body, of the inertial mass body the other way about the axis of the motor side rotating body, and moving the second coupling member toward the teeth of the input gear in conjunction with relative rotation, with respect to the motor side rotating body, of the inertial mass body the one way about the axis of the motor side rotating body; and an urging section for, in accordance with the rotation of the motor side rotating body, urging the inertial mass body in the direction of the rotation of the motor side rotating body and causing the inertial mass body to rotate to follow the motor side rotating body.

* * * * *